United States Patent [19]

Dyer et al.

[11] Patent Number: 4,971,005
[45] Date of Patent: Nov. 20, 1990

[54] FUEL CONTROL UTILIZING A MULTIFUNCTION VALVE

[75] Inventors: Gerald P. Dyer, Enfield; Brian G. Donnelly, Suffield, both of Conn.

[73] Assignee: United Technologies Corporation, Hartford, Conn.

[21] Appl. No.: 386,315

[22] Filed: Jul. 28, 1989

[51] Int. Cl.⁵ ............................................. F02M 39/00
[52] U.S. Cl. .................................. 123/381; 123/456; 123/494; 73/861; 73/119 A
[58] Field of Search ............... 123/381, 494, 458, 456; 73/861, 861.21, 119 A

[56] References Cited

U.S. PATENT DOCUMENTS

| | | | |
|---|---|---|---|
| 2,282,528 | 5/1942 | Neal | 73/861 |
| 3,204,623 | 9/1965 | Islfy | 123/381 |
| 3,592,177 | 7/1971 | Wehde | 123/456 |
| 3,600,612 | 8/1971 | Beeken | 73/861.21 |
| 3,728,989 | 4/1973 | Monpetit | 123/458 |
| 3,827,409 | 8/1974 | O'Neill | 123/458 |
| 4,248,194 | 2/1981 | Drutchas | 123/497 |
| 4,426,978 | 1/1984 | Sasaki | 123/458 |
| 4,430,899 | 2/1984 | Wessel | 73/119 A |
| 4,437,341 | 3/1984 | Ito | 73/119 A |

*Primary Examiner*—Carl Stuart Miller
*Attorney, Agent, or Firm*—Lloyd D. Doigan

[57] ABSTRACT

A fuel control is provided having a metering means for metering a weight flow of fuel, a control for controlling the metering means, a valve for determining a change in fluid pressure of the weight flow of fuel downstream of the metering means, the valve having; a pressure reaction surface disposed in the weight flow downstream of the metering means, the surface controlling an area of a window passing the weight flow of fuel therethrough, a spring attaching to the pressure reaction surface for balancing the change in fluid pressure of the weight flow of fuel against the pressure reaction surface, and a position sensor for continuously determining a position of the pressure reaction surface and continuously sending a signal of the position to the control means, wherein the control means determines the weight flow of fuel through the valve means according to the equation:

$$WF = KF(X) \sqrt{\frac{Fo + KsX}{Av}}$$

whereby K is a constant, F(X) is equal to an area of the window as a function of X, X is equal to a position of the reaction surface which controls the area of the window, Fo is a preload force of the spring, Ks is equal to a spring rate of the spring, and Av equals the area of the reaction surface.

6 Claims, 1 Drawing Sheet

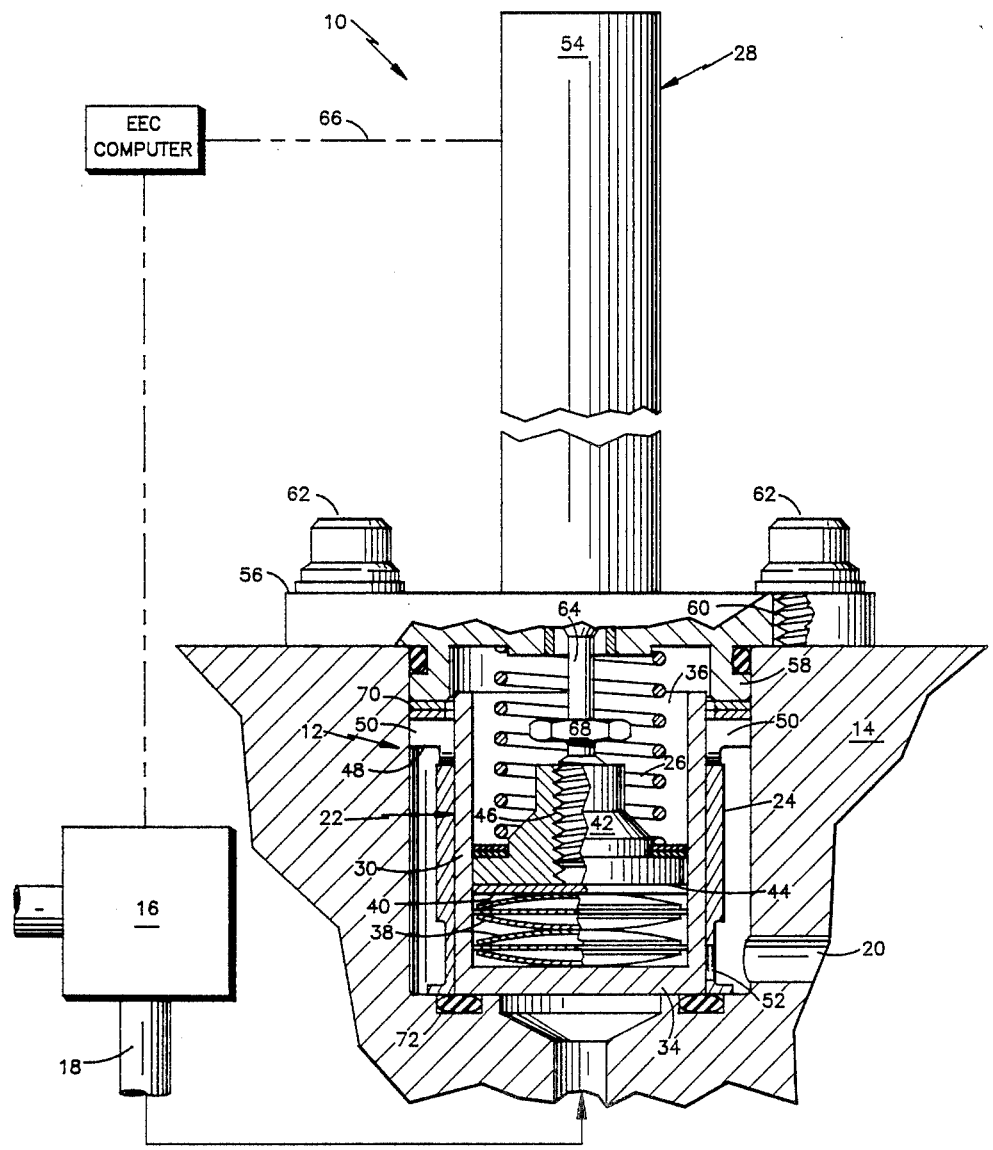

FUEL CONTROL UTILIZING A MULTIFUNCTION VALVE

DESCRIPTION

1. Technical Field

This invention relates to fuel controls and more particularly to a valve which performs more than one function in such fuel control.

2. Background Art

Gas turbine engines require a fuel control to meter the desired weight flow of fuel thereto. The fuel control generally has a means of supplying a desired weight flow of fuel to the engine, as well as a means for shutting off the flow of fuel to the engine.

Typically, to supply the desired weight flow of fuel, the fuel control utilizes a means for metering fuel, such as a metering valve, in conjunction with a pressure regulating valve to determine the actual weight flow of fuel to the engine. The pressure regulating valve generally maintains the pressure drop across the metering valve as a constant. A position sensor is attached to the metering valve to determine the position of the metering valve. The area of the metering window is determined from the position of the metering valve.

The position sensor sends a signal to an electronic engine control (EEC) which continuously determines the actual weight flow of fuel flowing to the gas turbine engine according to the equation:

$$Wf = KA \sqrt{(\text{delta } P)}$$

Where Wf is the weight flow, K is a constant, A is the area of the window and delta P is the pressure drop across the window. As the delta P is a constant, the only variable in determining Wf is the area of the window.

As a result, the EEC ensures that the desired weight flow of fuel is delivered by comparing the desired weight flow with the actual weight flow of fuel and then signalling the metering means to adjust the weight flow of fuel until the desired weight flow is achieved.

The shutoff valve is typically used to shut down the flow of fuel to the engine when the fluid pressure of the fuel drops below a certain value. The gas turbine engine is shutoff reliably with a minimum loss of fuel. If the flow of fuel is not shut off reliably, the fuel flowing to the relatively hot engine tends to coke in the fuel nozzles, limiting their effective life and performance.

DISCLOSURE OF INVENTION

It is an object of the invention to reduce the cost and weight of fuel controls.

It is a further object of the invention to reduce the cost and weight of fuel controls by combining the means for measuring fuel flow to the engine with the means for shutting off fuel flow.

It is a further object of the invention to obviate the need to maintain the pressure drop of the fuel metered by the fuel control as a constant.

It is a further object of the invention to eliminate the need for a pressure regulating valve in a fuel control.

According to the invention, a fuel control is provided having a metering means for metering a weight flow of fuel, a control for controlling the metering means, a valve for determining a change in fluid pressure of the weight flow of fuel downstream of the metering means, the valve having; a pressure reaction surface disposed in the weight flow downstream of the metering means, the surface controlling an area of a window passing the weight flow of fuel therethrough, a spring attaching to the pressure reaction surface for balancing the change in fluid pressure of the weight flow of fuel against the pressure reaction surface, and a position sensor for continuously determining a position of the pressure reaction surface and continuously sending a signal of the position to the control means, wherein the control means determines the weight flow of fuel through the valve means according to the equation:

$$WF = KF(X) \sqrt{\frac{Fo + KsX}{Av}}$$

whereby K is a constant, F(X) is equal to an area of the window as a function of X, X is equal to a position of the reaction surface, Fo is a preload force of the spring, Ks is equal to a spring rate of the spring, and Av equals the area of the reaction surface.

According to a feature of the invention, a seal engages the pressure reaction surface to shut flow through the valve if the fluid pressure upstream of the valve drops below Fo/Av.

According further to the invention, a valve for determining the weight flow of fuel is provided having; a pressure reaction surface disposed in the weight flow downstream of a metering means, the surface controlling an area of a window passing the weight flow of fuel therethrough, a spring attaching to the pressure reaction surface for balancing the change in fluid pressure of the weight flow of fuel against the pressure reaction surface, and a position sensor for continuously determining a position of the pressure reaction surface and continuously sending a signal of the position to a control means, wherein the control means determines the weight flow of fuel through the valve means according to the equation (the terms of which being defined above):

$$WF = KF(X) \sqrt{\frac{Fo + KsX}{Av}}.$$

Because the Wf is determined as a function of the position of the pressure reaction surface, the need for a pressure regulating valve is obviated. Moreover, the need for a separate shut-off valve is obviated as the preload of the spring provides sufficient force to close the window if the fuel pressure drops below a prescribed value.

These and other objects, features and advantages of the present invention will become more apparent in light of the following detailed description of a best mode embodiment thereof, as illustrated in the accompanying drawing.

BRIEF DESCRIPTION OF DRAWINGS

The figure is a prospective view, partially broken away of the fuel control incorporating the multifunction valve of the invention.

BEST MODE FOR CARRYING OUT THE INVENTION

Referring to the figure, an embodiment of a fuel control 10 which utilizes a multifunction valve 12 of the invention is shown. The valve is disposed in a fuel control housing 14. The valve receives a weight flow of fuel from a metering means (shown schematically at 16), such as a controllable output pump or a metering valve, via line 18 and passes the weight flow of fuel to a gas turbine engine (not shown) via line 20.

The multifunction valve consist of the following portions: a piston 22, a sleeve 24, a spring 26, and a position sensor 28.

The piston 22 consists of a cylinder 30 having a closed end 34, and a open end 36. The closed end 34 acts as a pressure reaction surface as will be discussed infra. Disposed within the interior of the sleeve 24 are a pair of bimetallic temperature compensating assemblies 38, a washer 40 and a spring seat 42.

The spring seat 42 has a circular portion 44, which is close-fitted within the piston 22 for translation therein, and a threaded bore 46 for attaching the spring seat 42 to the position sensor 28 as will be discussed infra.

The roughly cylindrical sleeve 24 houses the piston 22 for translation therein. The sleeve has a top portion 48 of increased diameter having a close fit with the housing 14. A slot 50 is cut through the top portion of the sleeve. A window 52 is disposed in the sleeve.

The position sensor 28 is disposed within a roughly cylindrical cover 54. The cover has a flange 56 extending radially therefrom and a collar 58 extending axially therefrom into the housing 14. The flange has a pair of openings 60 for receiving bolts 62 to attach the cover to the housing. The position sensor, which may be comprised of a linear variable displacement transducer (LVDT), or the like, has a threaded shaft 64 extending therefrom for engaging the threaded bore of the spring seat 42. Translational motion of the shaft causes the position sensor to send a signal via line 66 to the EEC.

In order to construct the valve, the sleeve 24 is disposed within the housing 14. The piston 22 is then inserted within the sleeve and the bimetallic assemblies 38 are disposed within the piston. The washer 40 is disposed on top of the bimetallic assemblies and the spring seat 42 is disposed on top of the washer 40. The spring 26 is then disposed upon the spring seat. Finally, the threaded shaft of the position sensor 28 is threaded into the bore of the spring seat, and calibrated via nut 68. The cover 54 is then bolted to the housing thereby preloading the spring between the cover and the spring seat. A plurality of spacing shims 70 may disposed between the collar 58 and the sleeve.

In operation, a fluid pressure force upstream of the window 52 is brought to bear on the closed end portion 34 (i.e. the reaction surface) of the piston 22. As the piston strokes, the window 52 in the sleeve 24 opens. The fuel flows through the line 20 to the gas turbine engine (not shown). A portion of the fuel downstream of the window 52 flows around the sleeve and through the slots 50 to the interior of the piston. The force resulting upon the reaction surface from the difference between upstream and downstream pressure is equal to the spring force. The difference in upstream and downstream pressure is due to the pressure drop across the window. As the pressure of the fuel delivered from the metering means 16 changes, the piston 22 strokes in response thereto as the fluid pressure changes upstream and downstream of the window.

The weight flow of the fuel flow is measured as follows. When a quantity of fuel passes through the valve 12, the piston 22 strokes, opening the window 52 in the sleeve 24 until the pressure drop across the window is equal to the spring force. The position sensor 28 sends a signal indicative of the piston position to the EEC via line 66. The EEC, which, as is well known in the art, receives signals and processes such signals to control various functions, determines the weight flow of fuel as follows:

$$Wf = KA \sqrt{(\text{delta } P)}$$

Where Wf is the weight flow, K is a constant, A is the area of the window 52 and delta P is the pressure drop across the window.

$$\text{If } A = WX \text{ for a rectangular window and delta } P = \frac{Fo + KsX}{Av}$$

Where W is the width of the window, X is equal to the displacement of the piston 22 (i.e. the height of the window), Fo is the spring 26 preload, Ks is the spring rate, and Av is the area of the closed face of the piston. It is well known that for other shaped windows, the area may be determined as a function of the stroke of the piston reaction surface, i.e. A=F(X). The delta P is equal to the force of the spring 26 over the area of the closed face of the piston. Substituting for A and delta P, it is determined that the weight flow is equal to:

$$\text{Then } Wf = KF(X) \sqrt{\frac{Fo + KsX}{Av}}.$$

As the stroke, X, is the only variable in the equation and is determined by the position sensor 28, the EEC may readily determine the weight flow from the stroke. As in the prior art, the EEC ensures that the desired weight flow of fuel is delivered by comparing a desired Wf of fuel with the determined Wf of fuel and then signalling the metering means to adjust the actual Wf of fuel until the desired Wf of fuel is achieved.

When the upstream pressure falls below that which is necessary to overcome the spring force, the preload spring force closes the valve. The seal 72 at the bottom of the sleeve contacts the piston, providing a drop tight fuel shutoff.

As stated above, because the Wf is determined as a function of the position of the pressure reaction surface, the need for a pressure regulating valve is obviated. Moreover, the need for a separate shut-off valve is obviated as the preload of the spring provides sufficient force to close the window if the fuel pressure drops below a prescribed value.

Although this invention has been shown and described with respect to detailed embodiments thereof, it will be understood by those skilled in the art that various changes in form and detail thereof may be made without departing from the spirit and scope of the claimed invention:

We claim:

1. A fuel control comprising:
   a metering means for metering a weight flow of fuel,
   a valve means for determining a change in fluid pressure of said weight flow of fuel downstream of said metering means, said valve means having;
   a window for passing said weight flow therethrough, a pressure reaction surface disposed in said weight flow, said surface controlling an area of said window, a spring attaching to said pressure reaction surface for balancing said change in fluid pressure of said weight flow of fuel against said pressure reaction surface, and a position sensor for continuously determining a position of said pressure reaction surface and continuously sending a signal of said position, control means for receiving said signal from said position sensor and for determining an actual weight flow of fuel passing through said window according to the equation:

$$WF = KF(X) \sqrt{\frac{F_o + K_sX}{A_v}}$$

wherein K is a constant, F(X) is equal to an area of said window as a function of X, X is equal to a position of said pressure reaction surface, Fo is a preload force of said spring, Ks is equal to a spring rate of said spring, and Av equals the area of the reaction surface.

2. The fuel control of claim 1 further comprising: sealing means for engaging said pressure reaction surface to shut flow through said valve if said fluid pressure upstream of said valve drops below Fo/Av.

3. A fluid control comprising:

a metering means for metering a weight flow of fluid, a valve means for determining a change in fluid pressure of said weight flow of fluid downstream of said metering means, said valve means having;

a window for passing said weight flow therethrough, a pressure reaction surface disposed in said weight flow, said surface controlling an area of said window, a spring attaching to said pressure reaction surface for balancing said change in fluid pressure of said weight flow of fluid against said pressure reaction surface, and a position sensor for continuously determining a position of said pressure reaction surface and continuously sending a signal of said position, control means for receiving said signal from said position sensor and for determining an actual weight flow of fluid passing through said window according to the equation:

$$WF = KF(X) \sqrt{\frac{F_o + K_sX}{A_v}}$$

wherein K is a constant, F(X) is equal to an area of said window as a function of X, X is equal to a position of said pressure reaction surface, Fo is a preload force of said spring, Ks is equal to a spring rate of said spring, and Av equals the area of the reaction surface.

4. The fluid control of claim 3 further comprising: sealing means for engaging said pressure reaction surface to shut flow through said valve if said fluid pressure upstream of said valve drops below Fo/Av.

5. A valve for determining weight flow of a fluid downstream of a means for metering said fluid comprising:

a window for passing said weight flow of fuel, a pressure reaction surface disposed in said weight flow, said pressure reaction surface controlling an area of said window, a spring attaching to said pressure reaction surface for balancing said change in fluid pressure of said weight flow of fluid against said pressure reaction surface, and a position sensor for continuously determining a position of said pressure reaction surface and continuously sending a signal, a control means for receiving said signal and determining the weight flow of fuel through said window means according to the equation:

$$WF = KF(X) \sqrt{\frac{F_o + K_sX}{A_v}}$$

whereby K is a constant, F(X) is equal to an area of said window as a function of X, X is equal to a position of said reaction surface, Fo is a preload force of said spring, Ks is equal to a spring rate of said spring, and Av equals the area of the reaction surface.

6. The fuel control of claim 5 further comprising: sealing means for engaging said pressure reaction surface to shut flow through said valve if said fluid pressure upstream of said valve drops below Fo/Av.

* * * * *